(12) United States Patent
Grinaski

(10) Patent No.: US 10,034,480 B2
(45) Date of Patent: Jul. 31, 2018

(54) DEHIDER REGULATOR VALVE

(71) Applicant: Jarvis Products Corporation, Middletown, CT (US)

(72) Inventor: Timothy Grinaski, Middletown, CT (US)

(73) Assignee: JARVIS PRODUCTS CORPORATION, Middletown, CT (US)

( * ) Notice: Subject to any disclaimer, the term of this patent is extended or adjusted under 35 U.S.C. 154(b) by 0 days.

(21) Appl. No.: 15/826,906

(22) Filed: Nov. 30, 2017

(65) Prior Publication Data

US 2018/0160691 A1 Jun. 14, 2018

Related U.S. Application Data

(60) Provisional application No. 62/431,675, filed on Dec. 8, 2016.

(51) Int. Cl.
| | |
|---|---|
| *A22B 5/00* | (2006.01) |
| *A22B 5/16* | (2006.01) |
| *F16K 1/12* | (2006.01) |
| *G05D 16/10* | (2006.01) |
| *F16K 31/122* | (2006.01) |

(52) U.S. Cl.
CPC .............. *A22B 5/163* (2013.01); *A22B 5/168* (2013.01); *F16K 1/126* (2013.01); *F16K 31/1221* (2013.01); *G05D 16/103* (2013.01)

(58) Field of Classification Search
CPC ....... A22B 5/163; A22B 5/165; B26B 25/002; B26D 2001/0046; B26D 2001/006; B26D 3/28

USPC .......... 452/125, 132, 133, 135, 137, 164; 20/205, 206, 215–222, 224, 276, 347, 20/286, 388, 389, 390, 355, 351, 371, 20/372

See application file for complete search history.

(56) References Cited

U.S. PATENT DOCUMENTS

| | | | |
|---|---|---|---|
| 4,215,451 A * | 8/1980 | Wikoff | A22B 5/163 30/206 |
| 5,122,092 A | 6/1992 | Abdul | |
| 5,515,930 A | 5/1996 | Glaser | |
| 5,605,287 A | 2/1997 | Mains | |
| 7,163,453 B1 * | 1/2007 | Gwyther | A22B 5/163 452/132 |
| 7,722,448 B2 | 5/2010 | Gwyther | |

(Continued)

*Primary Examiner* — Richard T Price, Jr.
(74) *Attorney, Agent, or Firm* — DeLio, Peterson & Curcio, LLC; Peter W. Peterson

(57) ABSTRACT

An air pressure regulator for a dehider includes a valve to open and close the flow of pressurized air in an air inlet, a first spring urging the valve in the direction of air flow through the inlet to close the valve, a plunger operable to move the valve from a closed to an open position against the direction of air flow, a piston connected to the valve exposed to the air flow, and a second spring between the piston and the plunger. Upon depressing the plunger, the second spring urges the piston to open the valve against the air flow direction to permit pressurized air to flow through the regulator. The maximum allowable air pressure through the regulator is determined by spring forces of the first and second springs and resistance of the piston to the flow of air through the valve.

19 Claims, 5 Drawing Sheets

(56) References Cited

U.S. PATENT DOCUMENTS 8,905,827 B1 * 12/2014 Ross .................. A22B 5/163
                                                  452/133
2005/0247750 A1   11/2005 Burkholder et al.
2008/0045130 A1    2/2008 Gwyther

* cited by examiner

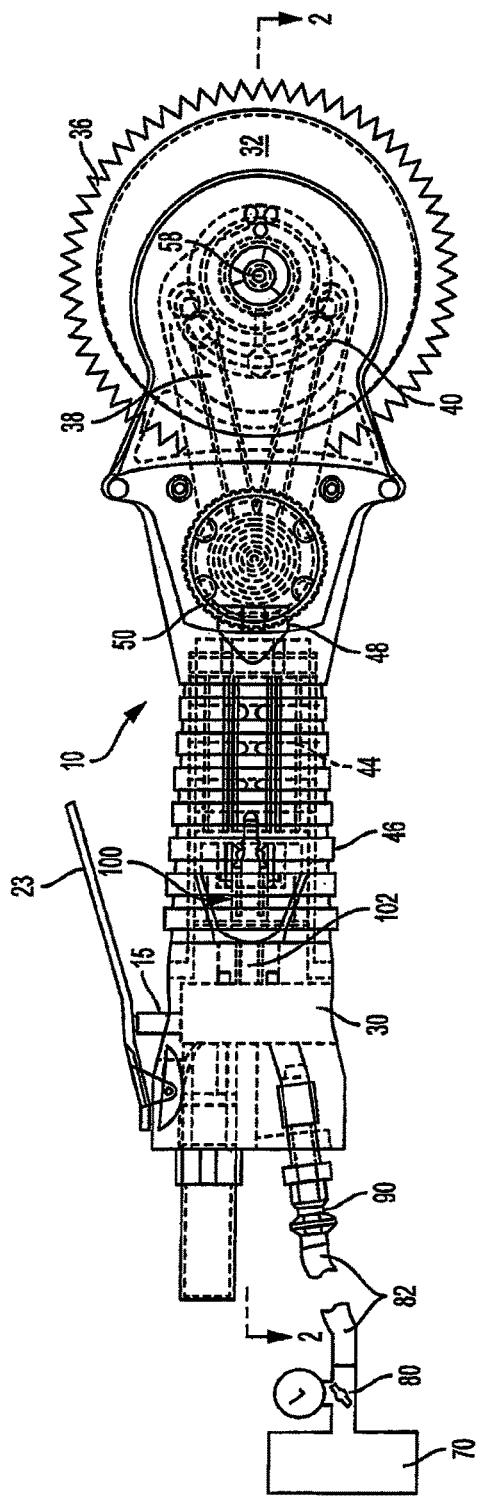
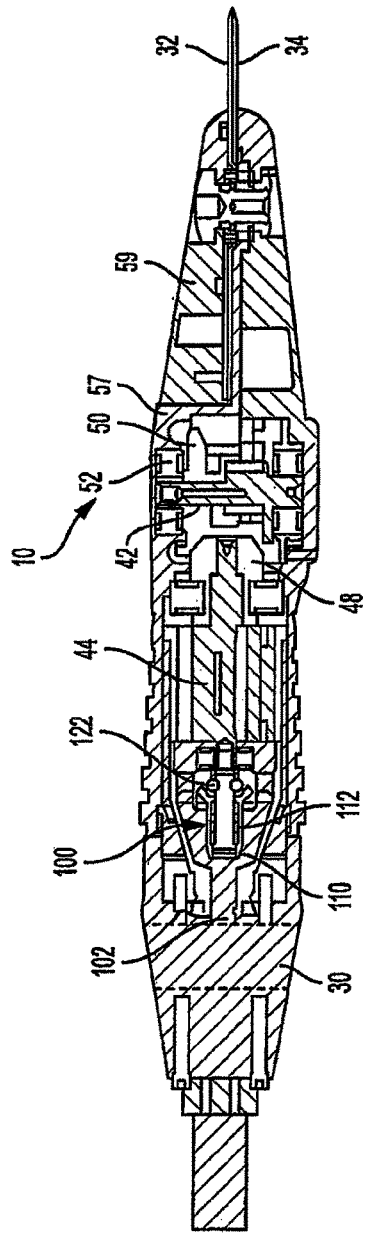
FIG. 1
FIG. 2

DEHIDER REGULATOR VALVE

BACKGROUND OF THE INVENTION

1. Field of the Invention

The present invention relates to air pressure regulation of pneumatic motors in handheld dehiders and powered skinning knives used to remove the hide of a carcass in a meat processing facility, particularly dehiders that use a pair of cutting disks driven in opposed cutting oscillations.

2. Description of Related Art

Handheld dehiders are used in meat processing facilities to remove the hide from an animal carcass. The most common type of dehider includes a pair of adjacent cutting disks or blades that are driven in opposed cutting oscillations by a corresponding pair of pushrods. The basic designs are shown in U.S. Pat. Nos. 5,122,092, 7,722,448 and 7,963,829 assigned to Jarvis Products Corporation, the assignee of the present invention. Other dehider designs are shown and described in U.S. Pat. Nos. 4,368,560, 3,435,522 and 2,751,680.

In the dehider design described in the patents above, each cutting blade includes teeth around its perimeter. The adjacent disk blades are driven in opposed cutting oscillations by a pair of pushrods connected to an eccentric drive mechanism operated by a pneumatic motor mounted in the handle of the tool. The motor rotates a pinion gear, which turns a main drive gear oriented at ninety degrees to the axis of the motor. The main drive gear turns the eccentric shaft to oscillate the pushrods. During each oscillation, the teeth on one disk blade move past the teeth on the adjacent and oppositely moving disk blade. This produces between adjacent and oppositely moving teeth a shearing and cutting action that quickly removes the hide from the carcass. The disclosure of the dehiders and powered skinning knives of the aforementioned patents, and their methods of operation, are hereby incorporated by reference.

To prevent the dehider from tending to slow down under a heavy cutting load, and permit it to operate at a nearly constant speed when operating under a load and when operating without a load, the '448 and '829 patents provided a speed governor for the pneumatic motor. The speed governor is disposed in the housing between the air inlet for the pressurized air and the motor, and automatically controls the flow of pressurized air to the pneumatic motor to maintain a desired rotational speed for the motor.

SUMMARY OF THE INVENTION

While a speed governor improves performance of a dehider and the operator, it has been found that problems may still arise from use of excessively high line pressure. At higher line pressures seen by the tool, for example, about 75 psi and higher, such line pressure may begin to overcome the ability of the governor to control speed.

Accordingly, it is an object of the present invention to provide a speed-governed dehider with an air pressure regulator, and a method of regulating incoming air pressure to a speed governor in a dehider.

It is another object of the present invention to provide a dehider air pressure regulator and method of operation that, up to a predetermined limit of line air pressure, reduces pressure sufficiently to let the governor control speed.

A further object of the invention is to provide a dehider air pressure regulator and method of operation that, at or above a predetermined limit of line air pressure, shuts off flow of air completely to the speed governor and pneumatic motor until the line pressure is reduced.

It is yet another object of the present invention to provide a dehider air pressure regulator and method of operation that works in conjunction with the dehider speed governor, enhancing the tool with smoother and more precisely controlled speed and torque operation.

Another object of the invention is to provide a dehider air pressure regulator and method of operation that provides for fail safe operation.

Still other objects and advantages of the invention will in part be obvious and will in part be apparent from the specification.

The above and other objects, which will be apparent to those skilled in the art, are achieved in the present invention which is directed to a handheld dehider comprising a housing, a pneumatic motor having an air inlet in the housing for providing a flow of pressurized air to the motor, a pair of cutting disks mounted in the housing, the cutting disks driven by the pneumatic motor, and a speed governor in the housing between the air inlet and the motor, the speed governor controlling the flow of pressurized air from the air inlet to the motor. The dehider further includes an air pressure regulator disposed along the air inlet. The regulator includes a valve to open and close flow of pressurized air in the air inlet, a first spring urging the valve in the direction of air flow through the inlet to close the valve, a plunger or other switch mechanism operable to move the valve from a closed to an open position against the direction of air flow in the air inlet, a piston connected to the valve on one side and exposed to flow of air through the air inlet, and a second spring disposed between the piston and the plunger.

In operation, upon depressing the plunger or otherwise operating the switch mechanism, the second spring urges the piston to open the valve against the air flow direction to permit pressurized air to flow through the regulator and on to the speed governor and the motor. Maximum pressure of the air through the regulator and subsequently through the speed governor is determined by spring forces of the first and second springs and resistance of the piston to flow of air through the valve.

During operation of the air pressure regulator to limit maximum pressure of the air through the speed governor, the sum of spring force of the first spring and force exerted on the piston by flow of air through the valve may be continuously offset by force of the second spring to maintain the degree of opening of the valve. Balancing of the first spring and piston air resistance forces against the second spring force may cause air pressure regulation through the speed governor within a predetermined pressure range.

The dehider may include one or more shims adjacent one or both of the first and second springs. The thickness of the shim(s) may provide adjustment of the spring forces of the first and second springs.

The dehider may also include a guide adjacent the plunger. The height or other dimension of the guide may determine the maximum degree of movement of the plunger to open the valve and regulating the maximum volume of air flow through the valve.

The dehider housing may be elongated, and the speed governor rotates about a longitudinal axis within the housing, and the plunger and valve may move between closed and open positions along an axis normal to the housing longitudinal axis. A lever may further be included on the housing for depressing the plunger.

In another aspect, the present invention is directed to a method of regulating air pressure to a pneumatic motor. The method provides an air pressure regulator disposed along an air inlet to the motor, the regulator having a valve to open and close flow of pressurized air in the air inlet, a first spring urging the valve in the direction of air flow through the inlet to close the valve, a switch operable to move the valve from a closed to an open position against the direction of air flow in the air inlet, a piston connected to the valve on one side and exposed to flow of air through the air inlet, and a second spring disposed between the piston and the plunger. Operating the switch causes the second spring to urge the piston to open the valve against the air flow direction to permit pressurized air to flow through the regulator and on to the speed governor and the motor, wherein maximum pressure of the air through the regulator and subsequently through the speed governor is determined by spring forces of the first and second springs and resistance of the piston to flow of air through the valve.

In an embodiment of the method, the pneumatic motor is in a housing and the air inlet is in the housing for providing a flow of pressurized air to the motor, and there is provided a speed governor in the housing between the air inlet and the motor, and wherein the speed governor controls the flow of pressurized air from the air inlet to the motor. The method may still further include the housing being elongated and the speed governor rotating about a longitudinal axis within the housing, and wherein the plunger and valve move between closed and open positions along an axis normal to the housing longitudinal axis. The housing may be for a handheld dehider and the pneumatic motor may drive a pair of cutting disks mounted in the housing.

In a further embodiment of the method, the dehider is connected to a source of pressurized air at a line pressure that may be varied, and wherein the air pressure regulator operates up to a predetermined line air pressure to reduce pressure to the speed governor sufficiently to let the governor control speed and, at or above the predetermined line pressure, the air pressure regulator shuts off flow of pressurized air to the speed governor completely until the line pressure is reduced. The method may further provide one or more shims adjacent one or both of the first and second springs, and wherein the thickness of the shim(s) provide adjustment of the spring forces of the first and second springs. A guide may be provided adjacent the plunger, the dimension of the guide determining the maximum degree of movement of the plunger to open the valve and regulating the maximum volume of air flow through the valve.

In a further aspect, the present invention is directed to an air pressure regulator for an air powered tool. The regulator is disposed in a housing for the tool along an air inlet, the regulator having a valve to open and close flow of pressurized air in the air inlet. A bias spring urges the valve in the direction of air flow through the inlet to close the valve. A plunger or other switch mechanism is operable to move the valve from a closed to an open position against the direction of air flow in the air inlet, and a regulator spring is disposed between the piston and the plunger, whereby upon depressing the plunger or otherwise operating the switch mechanism the regulator spring urges the piston to open the valve against the air flow direction to permit pressurized air to flow through the regulator, and wherein maximum pressure of the air through the regulator is determined by spring forces of the bias and regulator springs and resistance of the piston to flow of air through the valve.

In an embodiment, during operation of the air pressure regulator to limit maximum pressure of air, the sum of spring force of the bias spring and force exerted on the piston by flow of air through the valve is continuously offset by force of the regulator spring to maintain the degree of opening of the valve. Balancing of the bias spring and piston air resistance forces against the regulator spring force may cause air pressure regulation through a speed governor within a predetermined pressure range. One or more shims may be included adjacent one or both of the bias and regulator springs, the thickness of the shim(s) providing adjustment of the spring forces of the bias and regulator springs. The air pressure regulator may further include a guide adjacent the plunger, the dimension of the guide determining the maximum degree of movement of the plunger to open the valve and regulating the maximum volume of air flow through the valve. The air pressure regulator may still further include a lever on the housing adjacent the air pressure regulator for depressing the plunger.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a top plan view, with a portion of internal components in phantom lines, of an embodiment of a dehider that would employ the regulator of the present invention.

FIG. 2 is a right side elevational view of the embodiment of the dehider of FIG. 1, taken in cross section along the line 2-2.

DESCRIPTION OF THE EMBODIMENT(S)

Figure 3:
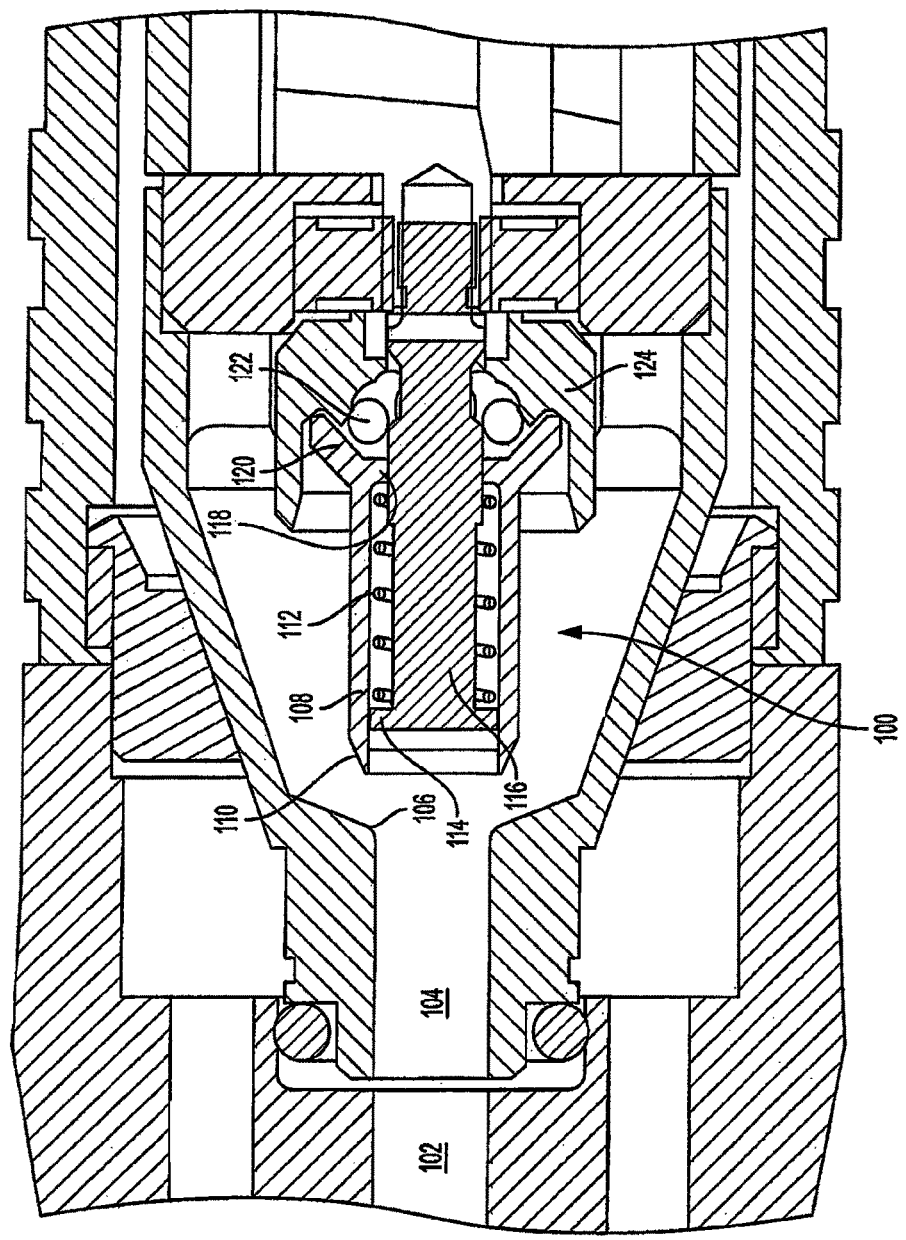
FIG. 3 is a side cross sectional view of the speed governor portion of the dehider of FIGS. 1 and 2.
Figure 4:
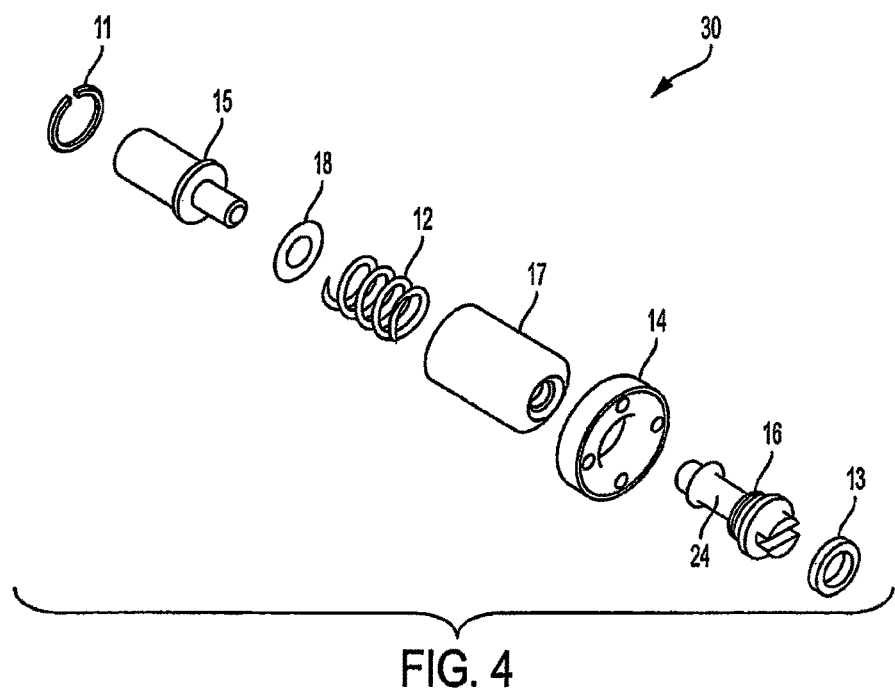
FIG. 4 is an exploded perspective view of components used in an embodiment of the dehider regulator of the present invention.

In describing the embodiment(s) of the present invention, reference will be made herein to FIGS. 1-7 of the drawings in which like numerals refer to like features of the invention.

FIGS. 1 and 2 show a handheld dehider 10 according to a first embodiment of the present invention. The dehider 10 includes a pair of adjacent cutting disks 32 and 34 having teeth 36 located around the perimeter of each disk. The cutting disks 32, 34 are driven by a pair of pushrods 38, 40 in opposed cutting oscillations by an eccentric shaft 42, which is itself driven by pneumatic motor 44 located in the handle 46 of the tool housing. The motor 44 drives pinion gear 48, which engages and turns the main drive gear 50. The main drive gear 50 is mounted on the eccentric shaft 42 such that rotation of the motor 44 and pinion gear 48 turns the main drive gear 50 and eccentric shaft to drive the pushrods 38, 40 and cutting disks 32, 34.

The housing includes the handle 46 at the back of the tool and a forward end of the tool that wraps around and below the drive area and extends underneath the cutting disks 32, 34. The housing also includes a drive mechanism cover 57 that extends over the drive area and immediately below the cutting disks, and a blade cover 59 located above the cutting disks. The housing design allows easy cleaning and removal of the drive mechanism without removing the motor.

The pushrods 38, 40 are driven by the eccentric shaft 42 such that the back ends of the pushrods 38, 40 are concentrically engaged by the eccentric shaft 42 and move in a circle as the eccentric shaft turns. The front ends of the pushrods move forwards and backwards approximately parallel to the axis of the dehider tool, and are connected to the cutting disks 32, 34, with one pushrod to each disk.

Each pushrod 38, 40 extends to an opposite side of the cutting disk shaft 58 and connects to its associated cutting disk on its respective side of the cutting disk shaft. As each pushrod moves forward, one pushrod turns the cutting disk it is connected to in the opposite direction from the cutting disk being driven by the other pushrod on the opposite side of the cutting disk shaft 58. This produces the opposed cutting disk oscillations of this tool.

During each cutting oscillation the teeth 36 on cutting disk 32 pass by the oppositely moving teeth on adjacent cutting disk 34. As the eccentric shaft continues to rotate, the pushrods 38, 40 are drawn back and the direction of motion of the cutting disks 32, 34 is reversed. This causes the cutting teeth 36 on one cutting disk to again pass by the oppositely moving teeth on the other cutting disk to produce a scissors-like action between the oppositely moving teeth that quickly and effectively allows the dehider operator to remove the hide of the carcass. The design and operation of the pneumatic motor and cutting disks described above, and speed governor described below, are more fully described in U.S. Pat. Nos. 5,122,092, 7,722,448 and 7,963,829, the disclosures of which are incorporated by reference.

An embodiment of the speed governor 100 is shown in FIG. 3. Pressurized air from the air passageway 102 flows into air passageway 104. The air passageway 104 includes a valve seat 106. Opposite the valve seat 106 is a valve head 108 that can move towards the valve seat 106. The valve head 108 has a beveled end 110 that acts to restrict airflow through the space between the valve seat 106 and the beveled end 110. Air that passes through the space between the valve seat 106 and the beveled end 110 eventually powers the motor 44.

The valve head 108 is biased to the right, as illustrated in FIG. 3 by governor spring 112. The governor spring 112 surrounds the core 116 and is trapped between an outwardly projecting lip 114 on the core 116 and an inwardly projecting lip 118 on the valve head 108. The valve head 108 also includes an outwardly angled flange 120 that traps a plurality of governor balls 122 between the angled flange 120, the core 116 and a governor housing 124. The valve head 108, core 116, governor housing 124, governor balls 122 and the governor spring 112 all spin with the motor 44. As the governor balls 122 spin with the motor, centrifugal force attempts to drive them outward and up the angled flange 120 between the angled flange 120 and the governor housing 124.

The governor balls 122 act as a movable mass that operates the governor by centrifugal force. The outward motion of the governor balls applies a force against the angled flange 120 and the valve head 108, which compresses the spring 112 and moves the beveled end 110 of the valve head 108 towards the valve seat 106. The faster the motor spins, the more this valve action restricts the airflow and the less pneumatic power is supplied to the motor 44.

As the dehider begins to cut and the load on the motor increases, the speed of the motor will drop. This decrease in speed will cause the centrifugal force applied by the governor balls to the valve head 108 to decrease. In turn, the spring 112 will move the valve head 108 away from the valve seat and the valve will open further, allowing more airflow. The result of increased airflow is that the motor will produce more power and will return to the original operating speed even under load.

The governor 100 will control the speed in the manner described under significant variations in operating load. When the motor is above the desired rotational speed, the governor restricts the flow of pressurized air to decrease speed. When the motor is below the desired rotational speed, the governor opens up to increase airflow and increase the motor's speed.

As shown in FIGS. 1 and 2, an air inlet 90 at the rear end of dehider tool handle 46 receives pressurized air used to drive pneumatic motor 44. Air inlet 90 is connected via hose 82 to a source of pressurized air, such as an air compressor 70 that may supply pressurized air to multiple air tools, and for other uses, throughout a plant. The pressure of the air supplied through hose 82 is set by a line pressure regulator 80, and the air pressure is typically adjusted and set by the dehider tool operator.

Figure 6:
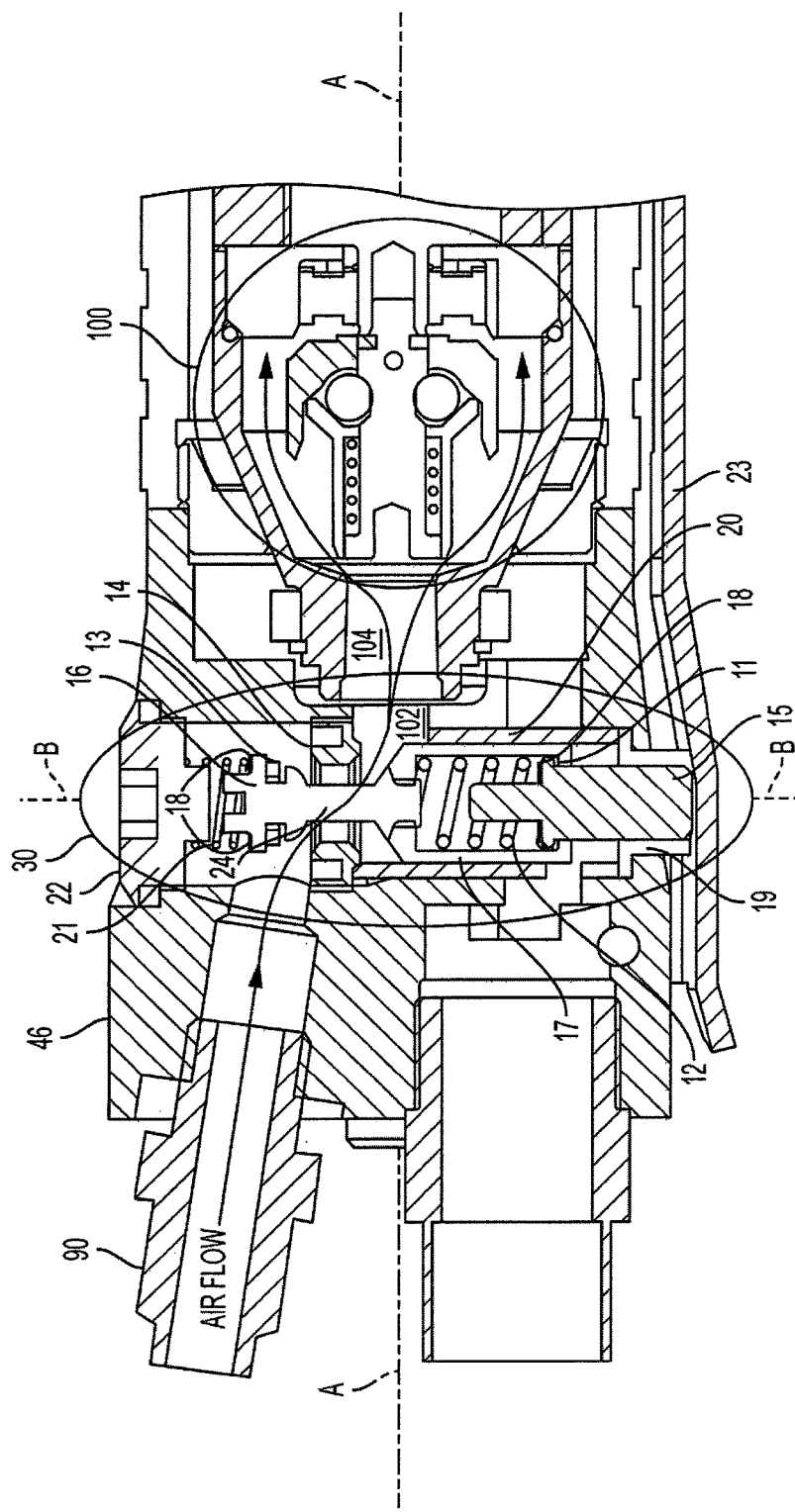
FIG. 6 is a cross-sectional view of an embodiment of the regulator of the present invention with the components of FIGS. 4 and 5 disposed in the handle portion of the dehider of FIG. 1, between the pressurized air inlet and speed governor.
Figure 7:
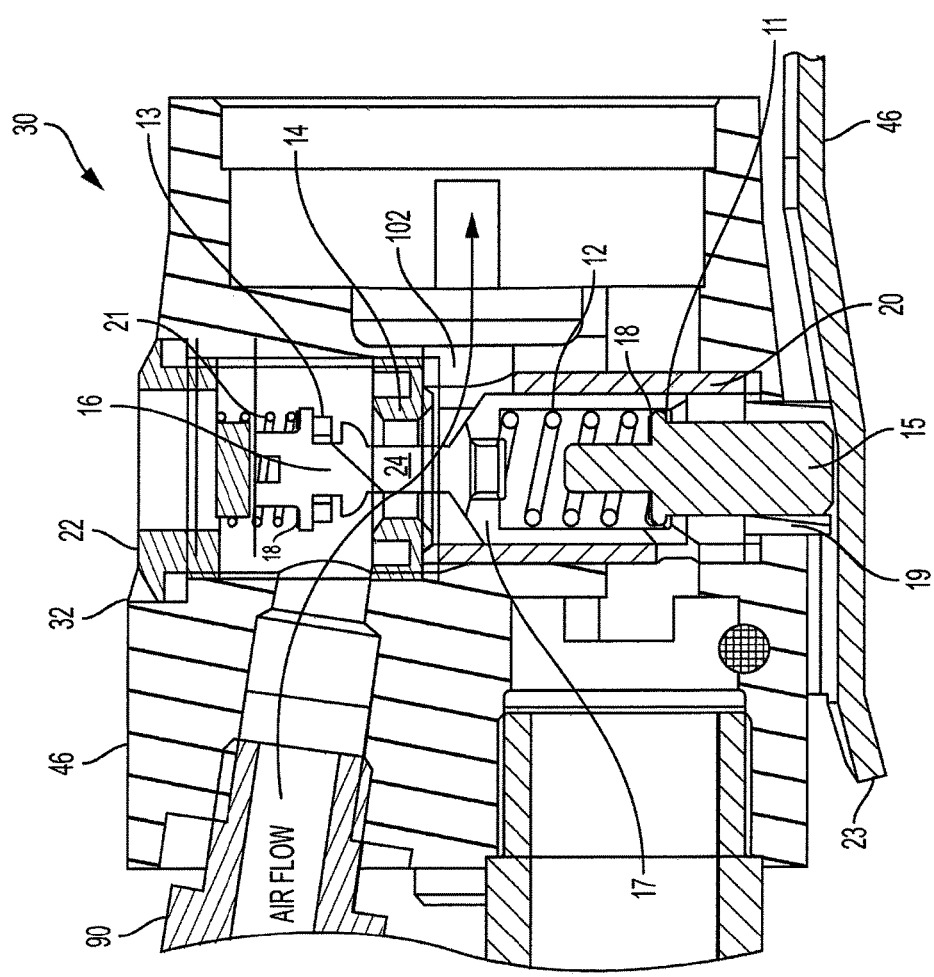
FIG. 7 is another cross-sectional view of the dehider regulator of FIG. 6.

The present invention provides a regulator 30 built into the tool housing handle 46, as shown by the example of FIGS. 6 and 7, that acts to limit incoming air pressure to the speed governor 100, and thereby maintaining an optimal cutting disk design speed of 6800-7200 strokes/minute. At higher line pressures the regulator 30 begins to shut off the supply of air, which then forces operators to turn the line pressure regulator down to reduce the air pressure entering the tool, which then brings the tool cutter speed back to the optimal design range. Operation at design speed keeps the cost of operation down, reduces energy (compressed air) usage and cost, and reduces vibration to which operators are exposed.

The embodiment of the regulator 30 of the present invention as shown includes both a trigger to activate the dehider air tool and an air pressure regulator, and is fully compatible with the speed governor 100 described herein and in the aforementioned patents. The use of the regulator 30 with speed governor 100 produces a dehider tool with more precisely controlled speed and torque operation. In addition, the regulator 30 will choke the flow of air if line pressure exceeds the safe operation pressure rating for the tool.

Figure 5:
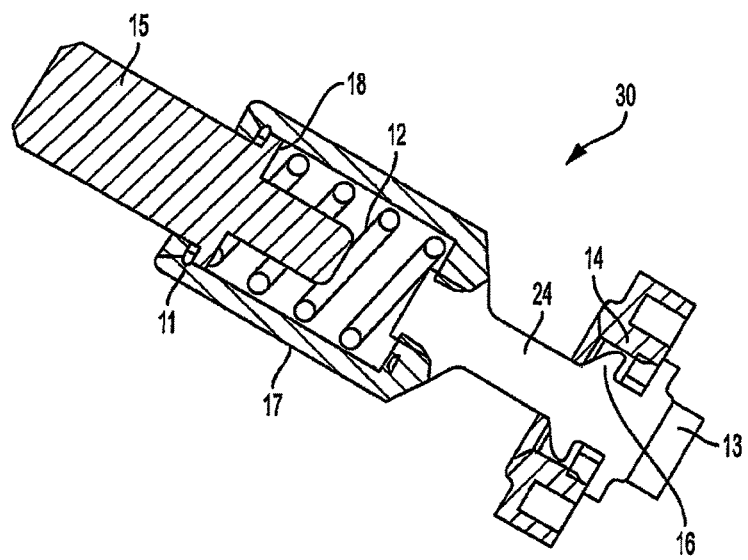
FIG. 5 is a side cross-sectional view of the dehider regulator components of FIG. 4 assembled.

Dehider housing 46 is elongated and speed governor 100 rotates about a longitudinal axis A within the housing. As shown, regulator 30 is mounted within the rear end of housing 46, between air inlet 90 and speed governor 100, and includes a plunger 15, piston 17, valve 16, valve seat bushing 14, and regulator spring 12. Other components may include an O-ring seal 13, shim 18, and retaining ring 11. The piston 17 and valve 16 are assembled as one, with the valve stem 24 extending through the valve seat bushing 14 between them, as shown in FIGS. 5, 6 and 7. The plunger 15 and valve 16 move between closed and open positions along an axis B normal to the housing longitudinal axis A (FIG. 6), and comprise mechanisms to switch between air-open and closed positions. Pivoting air control lever 23 contacts the external end of plunger 15 on the dehider housing.

Within the body 32 of regulator 30, regulator spring 12 is used to supply a force to the inner end of the piston 17 and is held in place by the plunger 15 and the retaining ring 11.

A shim 18 may be inserted between the regulator spring 12 and plunger 15. A shim 18 may also be placed adjacent the bias spring 21. The shim 18 thickness (whether by one or a plurality of shims) is selected to set the exact spring 12, 21 force for the regulation pressure desired. The O-ring 13 ensures a leak proof seal is made when the valve face is retracted into the valve seat bushing 14.

The regulator 30 is housed in the valve body 32, within a guide 19 and bushing 20, which may be made of hardened steel, and biased closed with a bias spring 21 held in place by the access cover 22. One or more shims 18 of desired thickness may be used at the ends of spring 21 to set the desired spring force. When the air control lever 23 is depressed, it urges plunger 15 upward to compress regulator spring 12, which then urges piston 17 upward to lift the regulator stem 24 and valve 16 out of valve seat bushing 14. Once the valve 16 is open, pressurized air may then flow from air inlet 90 through the annular opening created between the valve stem 24 and the valve seat bushing 14 and through passageways 102 and 104 into the speed governor 100, in the direction indicated by the arrow. The maximum volume of air allowed is controlled by the positive stop condition for lever 23 and plunger 15 established by the height dimension in direction B of the guide 19. Guide 19 determines the maximum degree of movement of the plunger 15 to open the valve 16 and regulates the maximum volume of air flow through the valve 16. Air pressure regulation is maintained thru the balancing of the regulator spring and bias spring forces against the force created by the pressure on top of the piston 17, with such air pressure regulation occurring through the speed governor 100 within a predetermined pressure range. As the piston 17 is forced down due to the force of flowing compressed air passing through valve seat bushing 14 above, plus the force of bias spring 21, it causes the valve 16 to move downward toward valve seat bushing 14 to choke off the air supply, thus reducing the pressure on the piston 17, which is then forced back up by the force of regulator spring 12. The sum of spring force of the bias spring and force exerted on the piston by flow of air through the valve is continuously offset by force of the regulator spring to maintain the degree of opening of the valve. So long as the lever 23 is depressed, this process continues causing air regulation at the set design pressure range, which may be predetermined by selection of the dimensions of the regulator components and forces exerted by springs 12 and 21. Once the operator removes force on lever 23, the expansion of bias spring 21 will cause valve 16 to move to a closed position, cutting off the air supply to the speed governor 100 and motor 44.

The regulator of the present invention may limit the operation pressure of the air tool to a safe level based on the tool design. The regulator 30 may prevent tool operation if line pressures exceed a maximum pressure, for example, about 80 to 90 psi. Up to about 75 to 80 psi regulator 30 reduces pressure sufficiently to let the governor control speed. At or above this pressure range regulator 30 shuts off flow of pressurized air completely until the line pressure is reduced. The regulator 30 works in conjunction with the governor 100, enhancing an air tool with smooth and precisely controlled speed and torque operation. The regulator of the present invention also provides for fail safe operation with regard to wear items, i.e., the springs and O-rings.

Thus, the present invention provides at least one or more of the following advantages: 1) a speed-governed dehider with an air pressure regulator, and a method of regulating incoming air pressure to a speed governor in a dehider; 2) a dehider air pressure regulator and method of operation that, up to a predetermined limit of line air pressure, reduces pressure sufficiently to let the governor control speed; 3) a dehider air pressure regulator and method of operation that, at or above a predetermined limit of line air pressure, shuts off flow of air completely to the speed governor and pneumatic motor until the line pressure is reduced; 4) a dehider air pressure regulator and method of operation that works in conjunction with the dehider speed governor, enhancing the tool with smoother and more precisely controlled speed and torque operation; and 5) a dehider air pressure regulator and method of operation that provides for fail safe operation.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A handheld dehider comprising:
    a housing;
    a pneumatic motor having an air inlet in the housing for providing a flow of pressurized air to the motor;
    a pair of cutting disks mounted in the housing, the cutting disks driven by the pneumatic motor;
    a speed governor in the housing between the air inlet and the motor, the speed governor controlling the flow of pressurized air from the air inlet to the motor; and
    an air pressure regulator disposed along the air inlet, the regulator having a valve to open and close flow of pressurized air in the air inlet, a first spring urging the valve in the direction of air flow through the inlet to close the valve, a plunger or other switch mechanism operable to move the valve from a closed to an open position against the direction of air flow in the air inlet, a piston connected to the valve on one side and exposed to flow of air through the air inlet, and a second spring disposed between the piston and the plunger,
    whereby upon depressing the plunger or otherwise operating the switch mechanism the second spring urges the piston to open the valve against the air flow direction to permit pressurized air to flow through the regulator and on to the speed governor and the motor, and
    wherein during operation the sum of spring force of the first spring and force exerted on the piston by flow of air through the valve is continuously offset by force of the second spring to maintain the degree of opening of the valve and wherein maximum pressure of the air through the regulator and subsequently through the speed governor is determined by spring forces of solely the first and second springs and resistance of the piston to flow of air through the valve.

2. The dehider of claim 1 wherein balancing of the first spring and piston air resistance forces against the second spring force causes air pressure regulation through the speed governor within a predetermined pressure range.

3. The dehider of claim 2 further including one or more shims adjacent one or both of the first and second springs, the thickness of the shim(s) providing adjustment of the spring forces of the first and second springs.

4. The dehider of claim 2 further including a guide adjacent the plunger, the dimension of the guide determining the maximum degree of movement of the plunger to open the valve and regulating the maximum volume of air flow through the valve.

5. The dehider of claim 1 wherein the housing is elongated and the speed governor rotates about a longitudinal axis within the housing, and wherein the plunger and valve move between closed and open positions along an axis normal to the housing longitudinal axis.

6. The dehider of claim 1 further including a lever on the housing for depressing the plunger.

7. A method of regulating air pressure to a pneumatic motor comprising:
providing an air pressure regulator disposed along an air inlet to the motor, the regulator having a valve to open and close flow of pressurized air in the air inlet, a first spring urging the valve in the direction of air flow through the inlet to close the valve, a switch operable to move the valve from a closed to an open position against the direction of air flow in the air inlet, a piston connected to the valve on one side and exposed to flow of air through the air inlet, and a second spring disposed between the piston and the plunger; and
operating the switch to cause the second spring to urge the piston to open the valve against the air flow direction to permit pressurized air to flow through the regulator and on to the speed governor and the motor,
wherein maximum pressure of the air through the regulator and subsequently through the speed governor is determined by spring forces of solely the first and second springs and resistance of the piston to flow of air through the valve.

8. The method of claim 7 wherein the pneumatic motor is in a housing and the air inlet is in the housing for providing a flow of pressurized air to the motor, and there is provided a speed governor in the housing between the air inlet and the motor, and wherein the speed governor controls the flow of pressurized air from the air inlet to the motor.

9. The method of claim 8 wherein the housing is elongated and the speed governor rotates about a longitudinal axis within the housing, and wherein the plunger and valve move between closed and open positions along an axis normal to the housing longitudinal axis.

10. The method of claim 8 wherein the housing is for a handheld dehider and the pneumatic motor drives a pair of cutting disks mounted in the housing.

11. The method of claim 10 wherein the dehider is connected to a source of pressurized air at a line pressure that may be varied, and wherein the air pressure regulator operates up to a predetermined line air pressure to reduce pressure to the speed governor sufficiently to let the governor control speed and, at or above the predetermined line pressure, the air pressure regulator shuts off flow of pressurized air to the speed governor completely until the line pressure is reduced.

12. The method of claim 7 further providing one or more shims adjacent one or both of the first and second springs, and wherein the thickness of the shim(s) provide adjustment of the spring forces of the first and second springs.

13. The method of claim 7 further providing a guide adjacent the plunger, the dimension of the guide determining the maximum degree of movement of the plunger to open the valve and regulating the maximum volume of air flow through the valve.

14. An air pressure regulator for an air powered tool, the regulator being disposed in a housing for the tool along an air inlet, the regulator having a valve to open and close flow of pressurized air in the air inlet, a bias spring urging the valve in the direction of air flow through the inlet to close the valve, a plunger or other switch mechanism operable to move the valve from a closed to an open position against the direction of air flow in the air inlet, a piston connected to the valve on one side and exposed to flow of air through the air inlet, and a regulator spring disposed between the piston and the plunger, the piston extending along the outside of the regulator spring, the regulator spring contacting an inner end of the piston and the plunger extending within the piston, whereby upon depressing the plunger or otherwise operating the switch mechanism the regulator spring urges the piston to open the valve against the air flow direction to permit pressurized air to flow through the regulator, and wherein maximum pressure of the air through the regulator is determined by spring forces of the bias and regulator springs and resistance of the piston to flow of air through the valve.

15. The air pressure regulator of claim 14 wherein during operation of the air pressure regulator to limit maximum pressure of air, the sum of spring force of the bias spring and force exerted on the piston by flow of air through the valve is continuously offset by force of the regulator spring to maintain the degree of opening of the valve.

16. The air pressure regulator of claim 14 wherein balancing of the bias spring and piston air resistance forces against the regulator spring force causes air pressure regulation through a speed governor within a predetermined pressure range.

17. The air pressure regulator of claim 16 further including one or more shims adjacent one or both of the bias and regulator springs, the thickness of the shim(s) providing adjustment of the spring forces of the bias and regulator springs.

18. The air pressure regulator of claim 14 further including a guide adjacent the plunger, the dimension of the guide determining the maximum degree of movement of the plunger to open the valve and regulating the maximum volume of air flow through the valve.

19. The air pressure regulator of claim 14 further including a lever on the housing adjacent the air pressure regulator for depressing the plunger.

* * * * *